United States Patent [19]

Dooley

[11] 4,359,838
[45] Nov. 23, 1982

[54] MIST SHIELD WATERING CAN

[76] Inventor: Stephanie M. Dooley, 1009 Broadway, Rockford, Ill. 61104

[21] Appl. No.: 179,680

[22] Filed: Aug. 20, 1980

[51] Int. Cl.³ .............................................. A01G 25/00
[52] U.S. Cl. ........................................................ 47/1 R
[58] Field of Search .................... 47/1; 4/144.3, 144.1, 4/DIG. 5; 141/331-339, 392, 389; 239/121-124; 222/108-111

[56] References Cited

U.S. PATENT DOCUMENTS

| | | | |
|---|---|---|---|
| 111,723 | 8/1871 | Baker | 141/334 X |
| 426,165 | 4/1890 | Brittin | 141/339 |
| 529,326 | 11/1894 | Hall | 222/109 |
| 633,628 | 9/1899 | Vacher | 141/334 X |
| 884,489 | 4/1908 | Hanson | 141/334 X |
| 1,077,491 | 11/1913 | Savage | 141/331 X |
| 1,081,825 | 12/1913 | Glassco | 239/121 X |
| 1,245,932 | 11/1917 | Larson | 141/331 X |
| 1,383,122 | 6/1921 | Jones | 222/108 |
| 1,587,934 | 6/1926 | Bartlett | 141/338 X |
| 1,650,739 | 11/1927 | Ridler | 239/121 X |
| 2,116,979 | 5/1938 | Moller | 141/334 X |
| 2,411,384 | 11/1946 | Miller et al. | 141/331 X |
| 3,490,501 | 1/1970 | Manem et al. | 141/331 X |
| 3,681,872 | 8/1972 | Leitch | 47/1 |
| 4,052,815 | 10/1977 | Clark | 47/1 R |

FOREIGN PATENT DOCUMENTS 599754  6/1960  Canada .................. 222/108

Primary Examiner—James R. Feyrer
Attorney, Agent, or Firm—Sixbey, Friedman & Leedom

[57] ABSTRACT

A mist shield and watering can for house plants is provided wherein a mist shield extends upwardly from an open topped container. A water discharge assembly is provided to provide water collected in the container during the misting of a plant to a discharge spout.

3 Claims, 7 Drawing Figures

MIST SHIELD WATERING CAN

TECHNICAL FIELD

The present invention relates generally to mist shields for house plants and more particularly to an improved mist shield which collects water and then may be employed as a watering can to discharge excess water.

BACKGROUND OF THE INVENTION

The leaves of house plants of many varieties should be regularly sprayed with a water mist to both provide water to the plant and to clean foreign matter from the plant leaves. Since house plants are normally employed in the interior of a house for decorative purposes in locations closely adjacent drapes, rugs, and expensive furniture, it has normally been necessary to move each house plant to a sink or a similar location to accomplish spraying of the leaves.

To alleviate the tedious and time consuming job of moving each house plant to a separate location to be sprayed and then returning the house plant to its original location, various means have been developed for shielding the house plant while it is sprayed in place. For example, plant shower curtains have been provided similar to that disclosed in U.S. Pat. No. 3,681,872, to enclose the plant in a hollow cylindrical curtain while spraying takes place. However, after the plant has been sprayed, it is necessary to mop up excess water which has been permitted to accumulate around the plant within the curtain.

To rectify the excess water problem prevalent with plant shower curtains, mist shields with water gathering troughs formed intergral therewith have been developed. Such a mist shield is shown in U.S. Pat. No. 4,052,815 to Clark, and has proven very effective in both shielding a plant during misting and retaining the excess water which impinges upon the shield. However, mist shields of the known type have required that frequent trips be made to a sink or drain remotely located from the plants being misted so that the excess water gathered in the shield trough can be discharged. Normally, where a substantial number of plants are involved, a number of trips must be made to discharge the collected water, and consequently, the advantage of the mist shield in permitting plants to be misted in place without removal to a remote location is somewhat lessened. Additionally, with conventional mist shields, it is still necessary to travel between a remote spigot or water source and the plants with a watering can to water the plants after they are misted.

DISCLOSURE OF THE INVENTION

The present invention is directed to a novel and improved mist shield which is adapted to collect water impinging upon the shield during the spraying of a plant and to facilitate application of this water directly to the plant. The mist shield is designed to direct water impinging thereon into a container, and the combined mist shield and container include means to direct the water from the container through a spout to a container for a plant. The spout may constitute a handle directly attached to the mist shield or a spout directly communicating with the water collecting container. In all instances, both the mist shield and the container are configured to partially encompass a plant to be sprayed so that effective shielding occurs.

These and other objects of the present invention will become readily apparent from a consideration of the following specification and claims taken in conjunction with the accompanying drawings.

DESCRIPTION OF THE PREFERRED EMBODIMENTS

Figure 1:
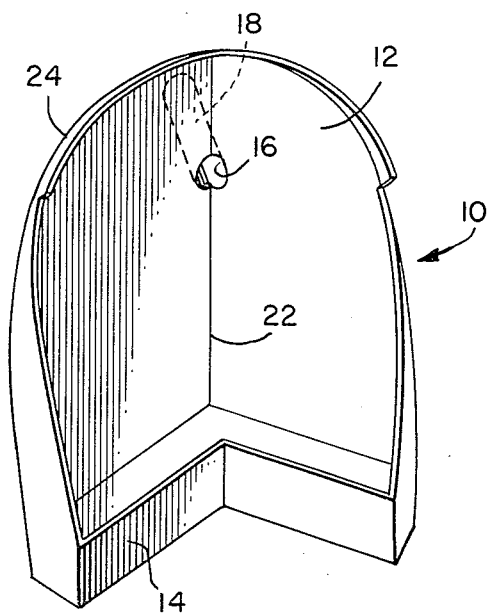
FIG. 1 is a perspective view of the mist shield and watering can of the present invention.
Figure 2:
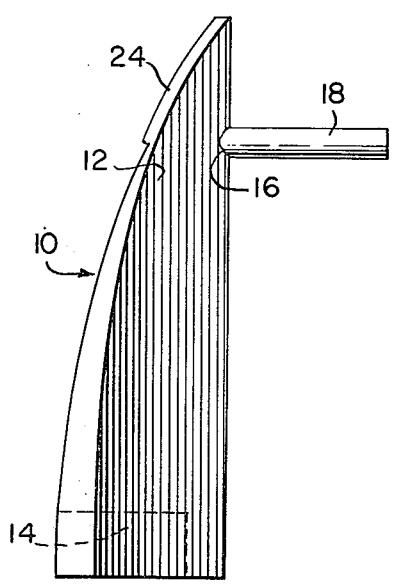
FIG. 2 is a view in side elevation of the mist shield and watering can of FIG. 1.

Referring now to FIGS. 1 and 2, the mist shield and watering can of the present invention indicated generally at 10 includes a mist shield 12 having an open topped water receiving trough 14 extending along the bottom side of the shield 12. An opening 16 is located substantially along the center line of the shield 12 and is spaced above the trough 14. This opening communicates with one end of a tubular handle 18 which is secured to project outwardly from the rear side of the mist shield 12. The handle 18 is tubular in form and includes an outermost open end 20.

The mist shield 12 may be formed of thin sheet plastic, sheet metal, or other suitable thin material and is somewhat semi-cylindrical in shape to partially encompass a plant in a container which rests against the front wall of the trough 14. The mist shield 12 is formed in a "V" configuration about a central apex line 22 which extends through the opening 16, and it will be noted that the trough 14 is similarly formed to conform to the configuration of the mist shield. The perimeter of the mist shield above the opening 16 is bent upwardly in FIG. 1 to form a raised bead or circumferential ridge 24.

The mist shield and watering can 10 may be properly positioned behind a potted plant by manipulation of the handle 18. The unit will then rest in position behind the plant on the base of the trough 14 while a suitable misting device is employed to mist the leaves of the plant. The mist shield 12 will protect objects positioned behind the mist shield, for water impinging on the mist shield will run down the shield surface into the trough 14. When misting is completed or the trough 14 fills with water, the handle 18 may be grasped and the mist shield tilted so that the open end 20 of the handle is positioned over the container for a plant. By continuing to tilt the shield, water from the trough 14 is caused to pass along the apex or crease 22 into the opening 16 and through the handle 18 and opening 20 to the plant container. Thus, the mist shield and watering can 10 may be used to water the plant and empty the trough 14 so that misting of a new plant may now be accomplished without the necessity of first discharging the trough 14 into a separate drain.

Figure 3:
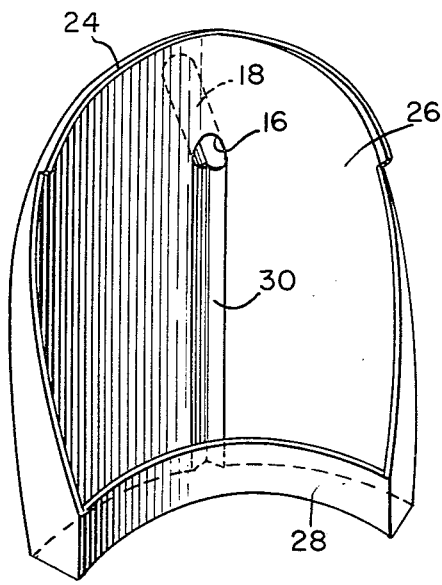
FIG. 3 is a perspective view of a second embodiment of the mist shield and watering can of the present invention.

A modified form of the mist shield and watering can is shown in FIG. 3 wherein a semi-cylindrical mist shield 26 replaces the semi-cylindrical V-shaped shield 12. In FIG. 3, the mist shield 26 is semi-cylindrical as is a trough 28 formed at the lower extremity of the mist shield. Since most plant containers are substantially cylindrical, the mist shield 26 and trough 28 may be placed closely adjacent a plant container. A V-shaped groove 30 extends from the opening 16 into the trough 28 through the open top thereof. The opening 16 is recessed at the end of the groove or channel 30 so that water from the trough may be directed into the opening 16 and then through the handle 18 and opening 20 in the manner described in connection with FIGS. 1 and 2. The bead or ridge 24 plus the recessed position of the opening 16 prevents water from passing from the mist shield above the opening 16 as the mist shield is tilted.

Figure 4:
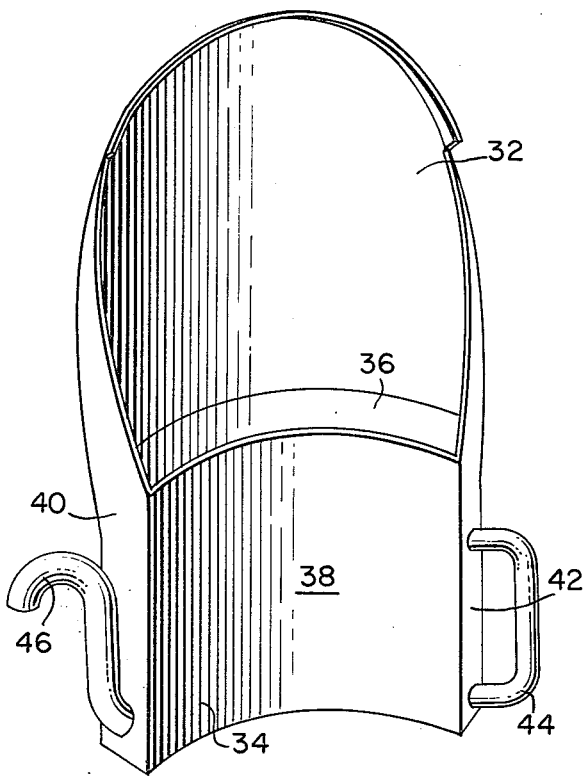
FIG. 4 is a perspective view of a third embodiment of the mist shield and watering can of the present invention.

Generally, the containers for plants are of appreciable height, and consequently it may be beneficial to provide a receptacle for receiving water from the mist shield which is adapted to contain a greater volume of water than are the troughs 14 and 28 of FIGS. 1 and 3. In FIG. 4, a semicylindrical mist shield 32 has a water receiving container 34 formed at the lower extremity thereof. As will be noted in FIG. 4, the water receiving container is of appreciable height, although the container should be configured so that the open top 36 thereof is positioned below the foliage of house plants to be misted.

Preferably, the container 34 is semi-cylindrical in configuration to conform to the configuration of the mist shield 32, and thus the container might include a semi-cylindrical inner wall 38, an outer wall spaced from the inner wall of similar shape, and a front wall 40 and rear wall 42 joining the inner and outer walls. A conventional handle 44 may be connected to the rear wall and a spout 46 mounted on the front wall may communicate with the interior of the receptacle 34 in the manner conventional to normal watering cans. Since the mist shield 32 constitutes an integral extension of the outer most wall of the receptacle 34, water impinging upon the mist shield will run down through the open top of the receptacle into the receptacle. Subsequently, the receptacle may be employed as a conventional watering can.

Figure 5:
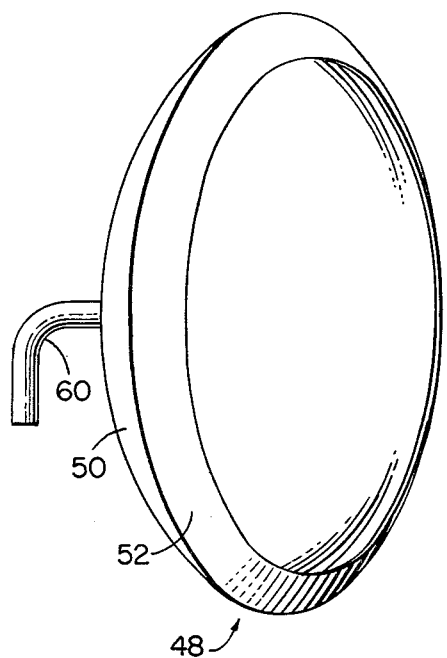
FIG. 5 is a perspective view of a fourth embodiment of the mist shield of the present invention.
Figure 6:
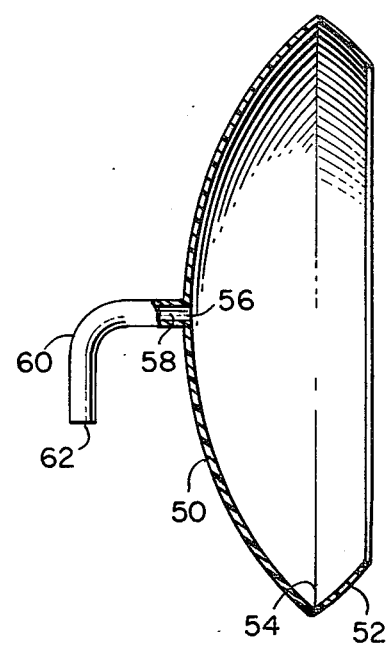
FIG. 6 is a sectional view of the mist shield of FIG. 5.

FIGS. 5 and 6 disclose a hand held mist shield 48 which, for purposes of illustration is circular in configuration although other shapes may be employed which embody the structural concepts to be described. The mist shield 48 includes a dished concave body 50 which terminates in a peripherally extending inturned flange 52. This flange forms an acute angle with the body 50 so as to provide a circumferentially extending channel 54. This channel collects water which impinges on the surface of the body 50 and runs into the channel.

A central aperture 56 is provided centrally in the body 50 to provide access to the interior 58 of an open ended, curved handle 60. This handle operates as a spout to pass water from the aperture 56 through the handle and out through the open end 62 thereof.

In use, the mist shield 48 may be held by the handle 60 and positioned behind a plant to be sprayed. Since the channel 54 extends completely around the mist shield body 50, the mist shield may be positioned in any attitude. Once water collects in the channel 54, the shield may be tilted so that the water passes out through the handle 60.

Figure 7:
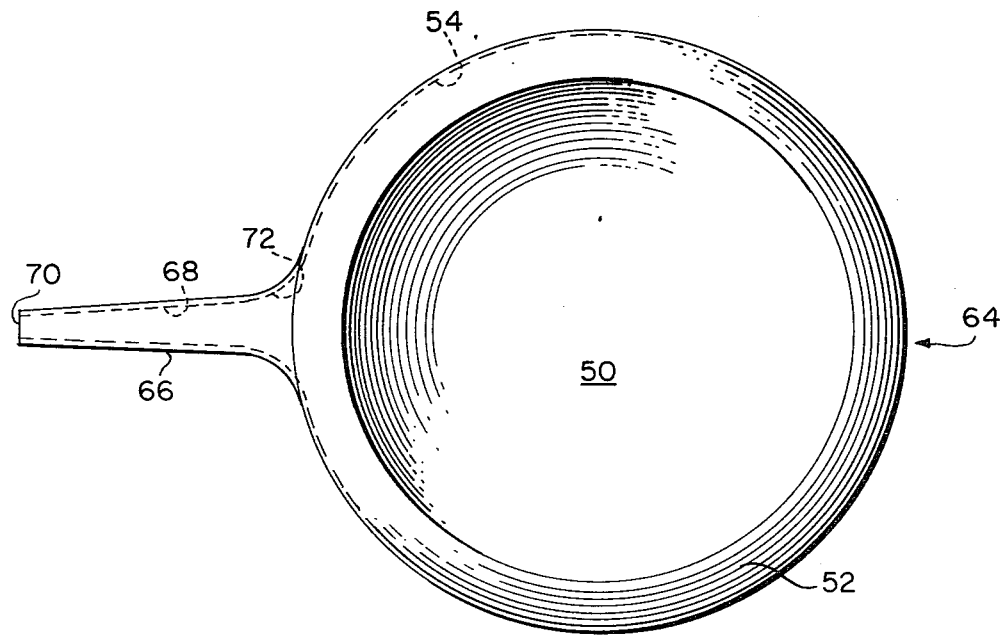
FIG. 7 is a plan view of a fifth embodiment of the mist shield of the present invention.

The mist shield 64 of FIG. 7 is quite similar to that of FIGS. 5 and 6 with the exception that a hollow handle 66 extends radially from the body 50. This handle is provided with an open ended conduit 68 which terminates at the outermost open end 70 of the handle. The innermost end of the conduit 68 flares outwardly at 72 and opens into the channel 54. Thus the mist shield 64 may be rotated about the central axis thereof to permit water in the channel 54 to be poured out through the handle 66.

Industrial Applicability

The mist shield and watering can of the present invention may be placed behind a house plant while the leaves thereof are misted. Mist impinging upon the mist shield is then directed into a trough or receptacle where excess water is collected. Subsequently, the excess water may be discharged back onto a plant by tilting the mist shield and watering can so that the water in the receptacle passes out through a discharge spout.

I claim:

1. A mist shield watering can for house plants comprising a body assembly including a mist sheild having a dished, concave surface, liquid discharge means formed in said mist shield at the lowest point of said dished concave surface, said liquid discharge means including a spout of hollow construction extending outwardly below the mist shield, and liquid retaining means formed on at least two opposing peripheral edges of said mist shield and extending a distance at least equal to the width of said mist shield, said liquid retaining means including an inturned flange, the edge of said inturned flange being spaced above the surface of said mist shield, said inturned flange forming an acute angle with said mist shield surface, said mist shield including a surface portion means indented below the remainder of the mist shield surface to provide a path of conduction for liquid from said liquid retaining means to said liquid discharge means.

2. A mist shield watering can for house plants comprising a body assembly including a mist shield, liquid discharge means formed in said mist shield, said liquid discharge means being formed to provide a handle, and liquid retaining means formed on at least two opposing peripheral edges of said mist shield and extending a distance at least equal to the width of said mist shield, said mist shield including a surface portion means indented below the remainder of the mist shield surface to provide a path of conduction for liquid from said liquid retaining means to said liquid discharge means formed on said mist shield, said liquid retaining means including a receptacle having an open top with an extent equal to at least the width of said mist shield, and said indented surface portion including inclined surfaces formed in said mist shield and extending outwardly and upwardly from either side of a central apex line, said liquid discharge means being formed on said mist shield on said central apex line and including a spout of hollow construction.

3. A mist shield watering can for house plants comprising a body assembly including a mist shield, the surface of said mist shield being a dished, concave surface, liquid discharge means formed in said mist shield at the periphery thereof, said liquid discharge means including a spout of hollow construction being formed to provide a handle for said mist shield and extending laterally and radially from said mist shield, and liquid retaining means formed on at least two opposing peripheral edges of said mist shield and extending a distance at least equal to the width of said mist shield, said liquid retaining means including an inturned flange, the edge of such inturned flange, being spaced above the surface of said mist shield, said inturned flange forming an acute angle with said mist shield surface.

* * * * *